Figure 1:
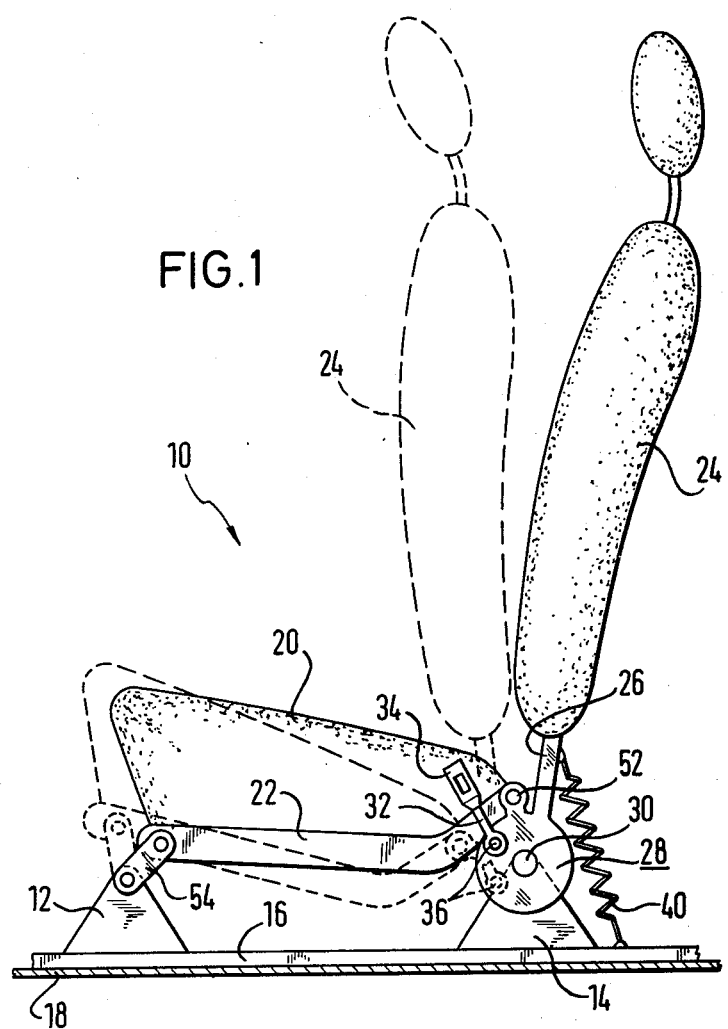

United States Patent [19]

Adomeit

[11] 4,257,626

[45] Mar. 24, 1981

[54] DEVICE FOR TIGHTENING A SAFETY BELT FOR A MOTOR VEHICLE

[75] Inventor: Heinz D. Adomeit, Berlin, Fed. Rep. of Germany

[73] Assignee: Repa Feinstanzwerk GmbH, Alfdorf, Fed. Rep. of Germany

[21] Appl. No.: 18,227

[22] Filed: Mar. 7, 1979

[30] Foreign Application Priority Data

Mar. 7, 1978 [DE] Fed. Rep. of Germany ....... 2810231

[51] Int. Cl.$^3$ ...................... A62B 35/00; B60R 21/10
[52] U.S. Cl. .................................... 280/806; 280/805; 297/216; 297/470
[58] Field of Search .............. 280/802, 806, 807, 808; 297/216, 473, 480, 470; 244/122 R, 122 B, 122 AG; 180/268; 296/65 A

[56] References Cited

U.S. PATENT DOCUMENTS

3,734,562   5/1973   Fourrey ............................. 297/216

Primary Examiner—John J. Love
Assistant Examiner—Randall A. Schrecengost
Attorney, Agent, or Firm—Herbert L. Lerner

[57] ABSTRACT

A device for tightening a safety belt about a person in a seat mounted on a vehicle body of a motor vehicle in which a belt anchor is attached to the vehicle. The belt anchor is supported movably relative to the vehicle body, and the belt anchor is coupled to a mass of a vehicle part which is arranged movably so as to execute a forced motion relative to the vehicle body if the vehicle hits an obstacle. The seat has a tiltably supported seat back frame which constitutes at least part of the mass, and wherein the belt anchor is linked-on to the lower part of the tiltably supported seat back frame. The mass is spring-loaded against motion relative to the vehicle body.

8 Claims, 4 Drawing Figures

DEVICE FOR TIGHTENING A SAFETY BELT FOR A MOTOR VEHICLE

The invention relates to a device for tightening a safety belt for a motor vehicle, consisting of a belt anchor attached to the vehicle.

Optimum effectiveness of a safety belt in a motor vehicle if the vehicle hits an obstacle requires a tautly applied safety belt. It is known that with the various kinds of belt systems, the belts are not automatically applied tautly. Rather, it almost always depends on whether the belt user himself tightens the safety belt after inserting it into the lock. In many cases, this is not done or only to an insufficient extent. Often, the safety belt is also loosened again, for instance, to operate a switch arranged at a larger distance, whereafter retightening the slack is forgotten.

There have been various attempts to tighten the belt in order to eliminate the belt slack by means of devices which operate automatically upon an impact of the vehicle, so as to ensure that the vehicle passengers are held back in an optimum manner. Thus, hydraulically operating belt tensioning cylinders are known which are actuated, for instance, via hydraulically operating energy absorbers, which in turn are connected to the bumpers of the vehicle and utilize their kinetic energy upon an impact of the vehicle. Such an installation is complicated and expensive to manufacture. Its disadvantage is that this device depends on the direction of the shock and works only for a single impact direction. It also requires regular maintenance so that it works properly when needed. Also known is a pyrotechnic belt tightening device. A blasting cartridge serves as an energy accumulator. This blasting cartridge is detonated by an electronic sensor which responds to a set vehicle deceleration. This device works independently of the shock direction or the kind of vehicle deceleration. The blasting cartridge moves a linear lifting plunger which is connected directly or via a transmission to the lock part in order to tighten the belt via the latter. In another known solution, the pyrotechnic drive motor acts directly on the automatic mechanism of an automated belt. A belt force limiter may also be provided here. The pretensioning forces are in the order of 3000 to 5000 N and they occur within 8 to 12 msec after the electronic sensor has responded. The disadvantage of this known pyrotechnic belt-tensioning device is seen in the fact that the use of one or several expensive electronic sensors is required, which can fail particularly if used for extended periods of time without servicing. Also the blasting cartridge must be checked or replaced regularly so that it is reliably effective when required.

It is an object of the invention to provide a device of the type mentioned at the outset which is of simple design and operates without additional aids external to the vehicle for tightening the belt.

According to the invention, the solution of this problem provides that the belt anchor is supported movably relative to the body of the vehicle and that the belt anchor is coupled to a mass of a vehicle part which is arranged movably so that is can execute a forced motion relative to the vehicle body if the vehicle hits an obstacle.

If a vehicle hits an obstacle, a rigid mass of the vehicle will be set in motion, as experience shows, a few milliseconds prior to the body of the passenger to be protected, since the passenger is braced by arms and legs and, on the other hand, executes defensive motions with his own body already immediately before the impact of the vehicle. The inertial forces occurring between the vehicle body and the mass of a vehicle part are generated immediately upon the impact of the vehicle with the obstacle. The invention now utilizes these inertial forces without time delay to start the tightening of the belt already before the body of the passenger to be protected reacts by its movement to the impact of the vehicle. Since primarily the belt slack normally existing in the safety belt is to be eliminated so that optimal effectiveness of the safety belt can be obtained, relatively small forces are required for this purpose. Also the inertial forces occurring in the safety belt itself are so small that they are no obstacle to a movement of the safety belt to eliminate the belt slack. Using a mass of a vehicle part which is coupled to the movably mounted belt anchor makes regular servicing unnecessary, as was required with the devices known from the state of the art. Proper operation of the device according to the invention is always assured by the simple mechanical connections also without any maintenance.

In one advantageous further embodiment of the invention, the belt anchor is linked in an extension of the tiltably supported backrest frame. In this connection, the backrest frame and the backrest parts fastened thereto are used as the mass which moves, by its movement, the belt anchor in the tightening direction. Since with a given mass of the backrest and the existing vehicle deceleration a force sufficient for pretensioning the belt is available at the extension of the backrest frame via the lever ratio, the belt slack can be eliminated very quickly at the beginning of the vehicle impact. Thus, no additional elements are necessary which would require regular maintenance to assure proper operation.

An advantageous further embodiment of the invention is to design the end of the tiltably supported backrest frame as a belt anchor support plate to which the belt anchor or the lock part is linked and on the circumference of which a stop for the normal upright position and ratchet teeth are formed, and to mount at the frame part of the seat a pawl for locking the lock part in a position displaced in the tightening direction. Through this embodiment of a design of the extension of the backrest frame as a belt anchor support plate, a return stop can be integrated. A still other advantageous embodiment of the invention is seen in linking the belt anchor to the belt anchor support plate in such a manner that a long tensioning path of the lock part can be executed with a small tilting angle of the back rest. A still further embodiment of the invention consists in that the mass is spring-loaded against motion relative to the vehicle body. It is achieved thereby that the device for tightening the safety belt becomes effective only after this spring force is overcome. A still other embodiment of the invention is characterized by the feature that a beyond-dead-center tension spring is linked to the belt anchor support plate in such a manner that at rest, its force is directed against a tilting movement of the backrest frame and that its force is directed in the motion direction of the belt anchor after a few degrees of arc of rotation of the belt anchor support plate. This means that from a certain small angle of the tilting motion of the backrest on, this spring also helps to tighten the safety belt, as the linkage point of the beyond-dead-center tension spring at the support plate has been moved relative to the opposite linkage point over the pivot of the belt anchor support plate. Another advantageous further embodiment of the invention is seen in the provision that the seat part is linked with its rear end to the belt anchor support plate for forward movement and with its front end to the vehicle body via rising levers for aiding the tightening of the safety belts and for increasing the inclination of the seat surface if the backrest is tilted. It is thereby achieved in an advantageous manner that through the rear linkage of the seat part to the belt anchor support plate, the mass of the seat is likewise utilized for using also the belt anchor support plate for tightening the safety belt. The increase of the inclination of the seat also aids the tightening of the safety belt, because the hips of the person to be protected are pushed against the hip belt due to the forward and upward movement of the seat. An advantageous further embodiment of the invention is also seen in the provision that the end of the belt is fastened to the vehicle body and that the movable belt anchor engages the safety belt ahead of the end of the belt. Finally, a further embodiment of the invention consists of the provision that the belt anchor is linked to the belt anchor support plate with a beyond-dead-center support and that a stop for limiting the motion is arranged at the movable parts. In this embodiment, the return stop can be dispensed with, since after tightening the safety belt, the belt force is directed so that the belt anchor can no longer be returned to its normal position without additional force.

In the following, embodiment examples of the invention are described, which are depicted in the drawing, where FIG. 1 shows a side view of a vehicle seat with an embodiment of a device for tightening a safety belt for a motor vehicle, FIG. 2, a side view of a belt anchor support plate of the embodiment of FIG. 1 with an end stop and a return ratchet stop, FIG. 3, a side view of a different embodiment of a belt anchor support plate, in which some parts have been omitted, and FIG. 4, a side view of a further belt anchor support plate with a beyond-dead-center support of the belt anchor.

According to FIG. 1, a vehicle seat designated in general with 10 is mounted by frame parts 12, 14 to seat tracks 16, which in turn are anchored to the vehicle body 18. The vehicle seat 10 consists of a seat part 20 with frame 22 and a backrest part 24 with a backrest frame 26. According to FIGS. 1 and 2, the lower end of the backrest frame 26 is made with a belt anchor support plate 28 which is rotatably mounted at 30 to the rear frame part 14 of the vehicle seat 10. A belt lock part 32 with a belt lock 34 of a vehicle safety belt, not shown, is linked by the belt anchor 36 to the belt anchor support plate 28 in such a manner that the belt anchor 36 of the belt lock part moves counterclockwise in FIG. 1 toward the bottom of the vehicle if the vehicle backrest 24 is tilted, whereby the vehicle safety belt is tightened with the other fixed points thereof remaining unchanged. The belt anchor 36 of the belt lock part then moves in the direction of the arrow 38. Against an unintended movement of the backrest 24 of the vehicle, a strong spring 40 engages the backrest frame 26 on the one hand and the vehicle body 18 on the other hand. The spring 40 is designed so that its force is overcome only if the vehicle hits an obstacle but not when the vehicle is normally and strongly braked. In addition to the device for pretensioning the vehicle safety belt shown, which utilizes the tilting of the backrest, the latter further has a device, not shown, which operates independently the adjustment of the inclination of the backrest in normal vehicle operation, continuously or in steps.

Figure 2:
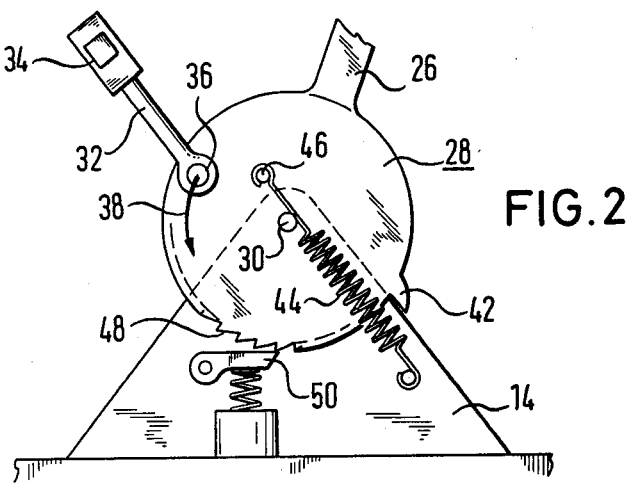

According to FIG. 2, the belt anchor support plate 28 has at its circumference a stop 42 which cooperates with a corresponding stop at the rear frame part 14 of the vehicle seat. Against this stop, the return spring 40 pulls the backrest and thereby, the belt tightening device into its normal or starting position. An aiding effect in this respect is provided by a spring 44 which is attached at one end to the frame part 14 and at its other end 46 to the belt anchor support plate 28 just before it reaches dead center. If for pretensioning the safety belt the backrest 24 swings forward in the event of a vehicle collision, the end 46 of the pretensioned spring 44 gets over dead center after a few degrees of arc of rotation of the belt anchor support plate 28 and therefore over the pivot 30, so that it subsequently aids the tilting of the backrest and thereby, the tightening of the safety belt by its tension.

According to FIG. 2, ratchet teeth 48 are further arranged at the circumference of the belt anchor support plate 28, which are in engagement with a pawl 50 resiliently attached to the rear frame part 14. This ratchet arrangement acts as a return ratchet stop. If the backrest 24 moves forward upon an impact of the vehicle on an obstacle and thereby has rotated the belt anchor support plate in the direction of the arrow to pretension the safety belt, the ratchet teeth 48 and the pawl 50 hold the backrest in the position reached and the vehicle safety belt in the pretensioned condition.

For pretensioning the safety belt serves also an additional change of the seat inclination. To this end, the rear end of the seat part 20 is linked, according to FIG. 1, to an extension 52 at the circumference of the belt anchor support plate 28, so as to aid with its additional inertial forces the tightening of the safety belt by the backrest. The front end of the seat part is linked to the front frame part 12 via levers 54 in such a way that the front end of the seat rises if the belt anchor support plate 28 rotates in the direction of the arrow and the extension 52 moves accordingly. This inclination of the seat part pushes the hips of the body to be held back against the hip belt of a three-point safety belt, which is pulled taut by the belt tightening device at the same time. Thus, optimum effectiveness of the vehicle safety belt is ensured in the event of a sudden deceleration of the vehicle.

Figure 3:
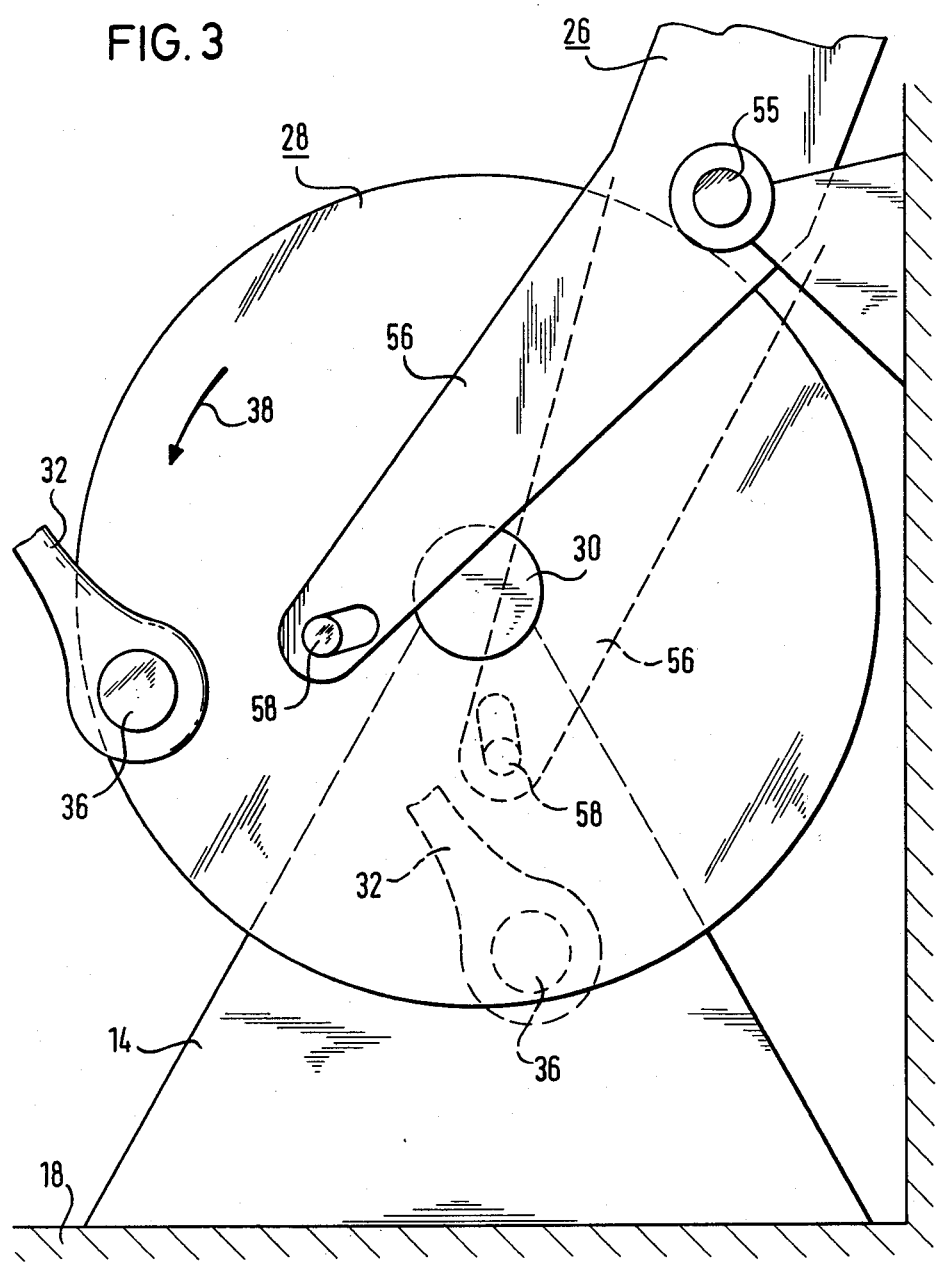

In FIG. 3, a somewhat modified embodiment of a belt anchor support plate 28 is shown, which is rotatably mounted at 30 in the rear frame part 14. The belt anchor 36 is pivoted adjacent to the circumference of the belt anchor support plate 28. The belt anchor 36 is connected to the belt lock part 32. The backrest frame 26 is tiltably supported at 55 on the vehicle body. An extension 56 of the backrest frame 26 engages the belt anchor support plate 28 at 58. By tilting the backrest frame 26 counterclockwise in FIG. 3, the extension 56 is displaced into the position shown dashed. This brings the belt anchor 36 into the dashed position if the belt anchor support plate 28 is rotated in the direction of the arrow 38. Inspection of FIG. 3 explains already that the belt anchor 36 travels a relatively large distance if the backrest frame 26 is tilted by only a few degrees of arc, whereby the belt slack can be taken out of the vehicle safety belt. At the same time, the safety belt is pretensioned.

Figure 4:
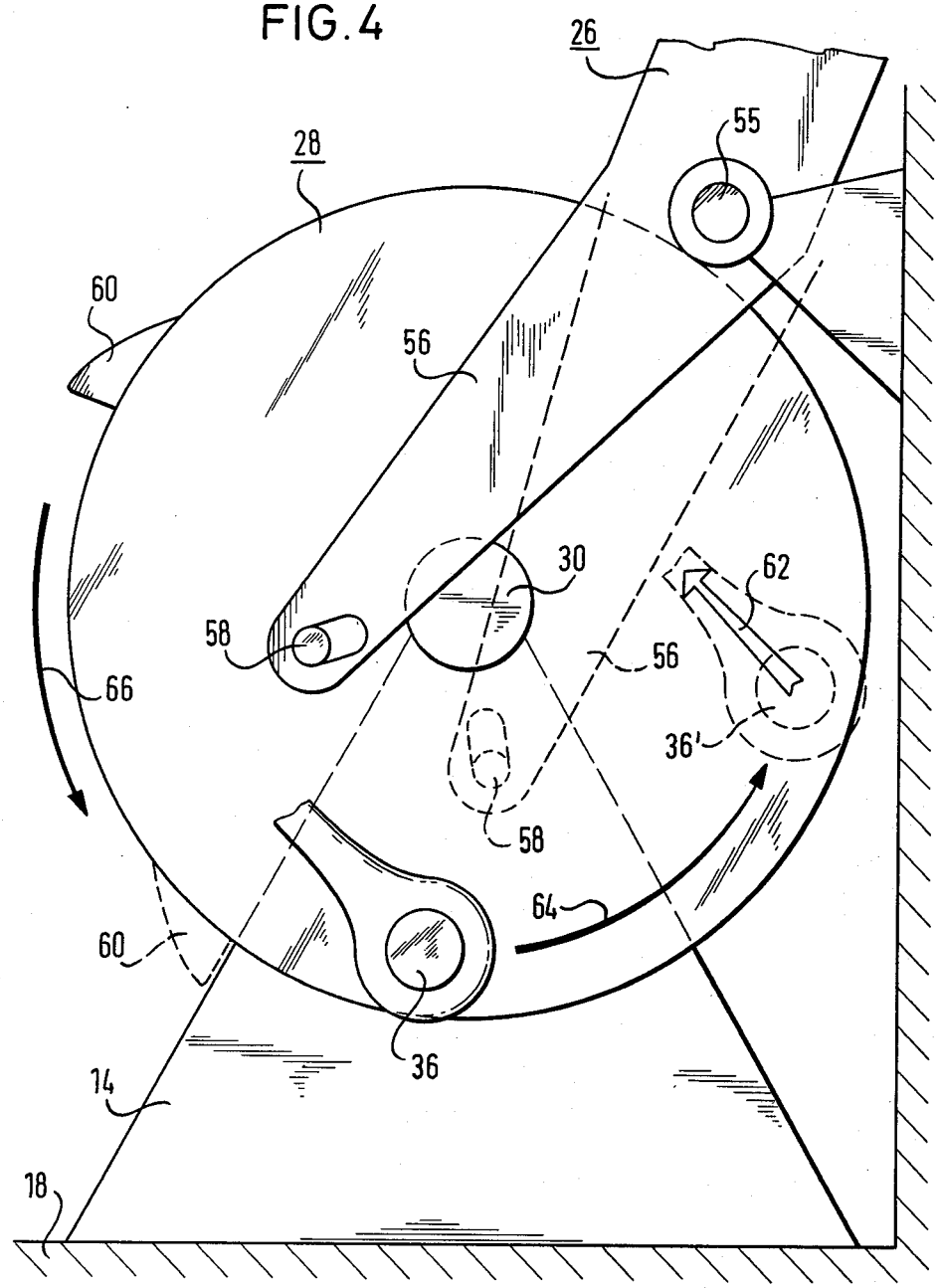

FIG. 4 shows an arrangement of the belt anchor support plate 28 and of the vehicle backrest frame 26 similar to that of FIG. 3. The backrest frame 26 is mounted on the vehicle body at 55. The belt anchor support plate 28 is in turn mounted rotatably at 30 on the frame part 14. The belt anchor is linked to the belt anchor support plate 28 at 36. The extension 56 of the backrest frame 28 in turn is linked at 58 to the belt anchor support plate 28. A stop 60 is arranged at the circumference of the belt anchor support plate 28. If the backrest frame 26 is tilted upon impact of the vehicle on an obstacle, the belt anchor support plate 28 is rotated according to the arrow 64, so that the belt anchor 36 gets into the position indicated by 36'. In the process, a stop 60 on the circumference of the belt anchor support plate comes into engagement with the frame part 14 on the path of the arrow 66. Then, the belt force 62 attacking at the belt anchor 36 has a direction such that it is moved over dead-center, as referred to the center 30 of the belt anchor support plate 28, so that the latter is prevented from turning back by the direction of the belt force 62 after the safety belt is tightened. This saves a separate return ratchet stop.

I claim:

1. Device for tightening a safety belt about a person in a seat mounted on a vehicle body of a motor vehicle in which a belt anchor is attached to the vehicle, the improvement comprising said belt anchor supported movably relative to the vehicle body, and said belt anchor coupled to a mass of a vehicle part which is arranged movably so as to execute a forced motion relative to the vehicle body if the vehicle hits an obstacle; and wherein said seat has a tiltably supported seat back frame which constitutes at least part of said mass, and wherein the belt anchor is linked-on to the lower part of the tiltably supported seat back frame; and wherein the mass is spring-loaded against motion relative to the vehicle body.

2. Device for tightening a safety belt about a person in a seat mounted on a vehicle body of a motor vehicle in which a belt anchor is attached to the vehicle, the improvement comprising said belt anchor supported movably relative to the vehicle body, and said belt anchor coupled to a mass of a vehicle part which is arranged movably so as to execute a forced motion relative to the vehicle body if the vehicle hits an obstacle; and wherein said seat has a tiltably supported seat back frame which constitutes at least part of said mass, and wherein the belt anchor is linked-on to the lower part of the tiltably supported seat back frame; and wherein at said lower part at the end of the tiltably supported seat back frame is a belt anchor support plate, to which the belt anchor attached to a belt lock part with a belt lock of a vehicle safety belt is linked; and wherein on the circumference of said belt anchor support plate a stop for the normal upright position and ratchet teeth are formed; and wherein a pawl for locking said lock part in a position displaced in a tightening direction is mounted to a frame part of the seat adjacent the belt anchor support plate.

3. Device according to claim 2, wherein the belt anchor is linked to the belt anchor support plate to obtain a long tensioning distance of the lock part for a small tilting angle of the seat back.

4. Device according to claim 2 or claim 3, wherein the mass is spring-loaded against motion relative to the vehicle body.

5. Device according to claim 2 or claim 3, wherein a beyond-dead-center tension spring is linked to the belt anchor support plate in such a manner that in the rest position, its force is directed against a tilting motion of the seat back frame and that its force is directed in the direction of motion of the belt anchor after a few degrees of arc of rotation of the belt anchor support plate.

6. Device according to claim 2, wherein said seat has a seat part which is linked with its rear end for a forward movement at the belt anchor support plate and with its front end via rising levers to the vehicle body, whereby if the seat back frame is tilted, to aid the tightening of the safety belt and to increase the inclination of the seat surface.

7. Device according to claim 2, wherein the belt anchor is linked to the belt anchor support plate to enable the belt anchor upon rotation of the belt anchor support plate to move beyond-dead-center as referred to the center of the belt anchor support plate, and that a stop for limiting the motion is arranged at the support plate.

8. Device for tightening a safety belt about a person in a seat mounted on a vehicle body of a motor vehicle in which a belt anchor is attached to the vehicle, the improvement comprising said belt anchor supported movably relative to the vehicle body, and said belt anchor coupled to a mass of a vehicle part which is arranged movably so as to execute a forced motion relative to the vehicle body if the vehicle hits an obstacle; and wherein the mass is spring-loaded against motion relative to the vehicle body.

* * * * *